United States Patent
Ichikawa et al.

(10) Patent No.: US 7,793,711 B2
(45) Date of Patent: Sep. 14, 2010

(54) VEHICLE AIR CONDITIONER

(75) Inventors: Masaya Ichikawa, Kariya (JP);
Kazuhiro Togaru, Obu (JP); Yoshihisa Tsuchiya, Wako (JP); Ryoji Ehara, Wako (JP)

(73) Assignees: Denso Corporation, Kariya (JP);
Honda Motor Co., Ltd., Tokyo (JP)

( * ) Notice: Subject to any disclaimer, the term of this patent is extended or adjusted under 35 U.S.C. 154(b) by 846 days.

(21) Appl. No.: 11/726,297

(22) Filed: Mar. 21, 2007

(65) Prior Publication Data

US 2007/0221371 A1 Sep. 27, 2007

(30) Foreign Application Priority Data

Mar. 24, 2006 (JP) .............................. 2006-083568

(51) Int. Cl.
*B60H 1/00* (2006.01)
*B60H 1/22* (2006.01)

(52) U.S. Cl. .................... 165/202; 165/42; 165/43; 165/232; 165/270; 62/158; 62/186; 62/196.4; 62/272; 62/244; 237/2 B

(58) Field of Classification Search .............. 165/202, 165/42, 43, 232, 270; 62/158, 186, 196.4, 62/272, 244; 237/2 B
See application file for complete search history.

(56) References Cited

U.S. PATENT DOCUMENTS

| | | | |
|---|---|---|---|
| 6,662,579 B2 * | 12/2003 | Takano et al. | 62/186 |
| 6,679,079 B2 * | 1/2004 | Nagai et al. | 62/244 |
| 6,715,307 B2 * | 4/2004 | Hatakeyama et al. | 62/244 |
| 6,935,125 B2 * | 8/2005 | Wakuda | 62/196.4 |
| 7,043,928 B2 * | 5/2006 | Kurata et al. | 62/160 |
| 7,207,379 B2 * | 4/2007 | Takano et al. | 165/202 |

* cited by examiner

*Primary Examiner*—John K Ford
(74) *Attorney, Agent, or Firm*—Harness, Dickey & Pierce, PLC

(57) ABSTRACT

A vehicle air conditioner includes an air-conditioning ECU. The air-conditioning ECU performs a cooling mode operation in which air is cooled by an interior heat exchanger in a cooling refrigeration cycle. The air-conditioning ECU performs a heating mode operation, in which air is heated by the interior heat exchanger in a hot gas heater cycle. The air-conditioning ECU performs an air blowing operation in which air is blown toward an inner surface of a windshield of the vehicle without operating the compressor before performing a refrigerant collecting operation.

9 Claims, 5 Drawing Sheets

VEHICLE AIR CONDITIONER

CROSS REFERENCE TO RELATED APPLICATION

This application is based on and incorporates herein by reference Japanese Patent Application No. 2006-83568 filed on Mar. 24, 2006.

BACKGROUND OF THE INVENTION

1. Field of the Invention

The present invention relates to a vehicle air conditioner.

2. Description of Related Art

A conventional vehicle air conditioner controls a temperature of air blown out from an evaporator by limiting a hot gas refrigerant capacity when it is determined that there is retained water on the evaporator in a heating mode operation using a hot gas refrigerant. Through this control, a defogging effect is produced on a windshield of a vehicle, and a heating capacity of the heating mode, in which the hot gas refrigerant is used, is efficiently created (e.g., JP2003-159931A corresponding to U.S. Pat. No. 6,662,579).

However, when it is determined that there is not the retained water, the hot-gas heating mode operation is started in the above conventional vehicle air conditioner if an outside air temperature is relatively high (e.g., −10° C. to 5° C.) and humidity is high (e.g., relative humidity RH: 80% or higher). In this case, a fog is easily generated on the windshield due to a little condensed water which is generated during a refrigerant collecting operation before the hot-gas heating mode operation, thereby reducing visibility of a driver of the vehicle.

SUMMARY OF THE INVENTION

The present invention addresses the above disadvantages. Thus, it is an objective of the present invention to provide a vehicle air conditioner, which reduces a fog on a windshield of a vehicle at the time of starting of a heating mode operation using a hot gas refrigerant.

To achieve the objective of the present invention, there is provided an air conditioner for a vehicle. The air conditioner includes a compressor, an exterior heat exchanger, a cooling decompressor, an interior heat exchanger, and a control unit. The compressor is for compressing refrigerant. The exterior heat exchanger is for exchanging heat between outside air outside of a vehicle compartment and refrigerant flowing therethrough. The cooling decompressor is for decompressing refrigerant in a cooling mode operation. The interior heat exchanger is for exchanging heat between air to be blown into the vehicle compartment and refrigerant flowing therethrough. The control unit is for performing the cooling mode operation and a heating mode operation. The control unit performs the cooling mode operation with a cooling refrigeration cycle, in which refrigerant discharged from an outlet of the compressor is drawn to an inlet of the compressor after passing through the exterior heat exchanger, the cooling decompressor, and the interior heat exchanger in this order, so that the interior heat exchanger operates as an evaporator, in which the refrigerant evaporates by absorbing heat from air to be blown into the vehicle compartment. The control unit performs the heating mode operation with a hot gas heater cycle, in which refrigerant discharged from the outlet of the compressor flows through the interior heat exchanger while bypassing the exterior heat exchanger through a hot gas bypassing path, so that the interior heat exchanger operates as a radiator, which radiates heat to air to be blown into the vehicle compartment. The control unit performs a refrigerant collecting operation, in which refrigerant staying in the exterior heat exchanger is pushed out using refrigerant discharged from the compressor, before performing the heating mode operation. The control unit performs an air blowing operation in which air is blown toward an inner surface of a windshield of the vehicle without driving the compressor, before performing the refrigerant collecting operation.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Embodiments of the present invention will be described with reference to drawings.

Figure 1:
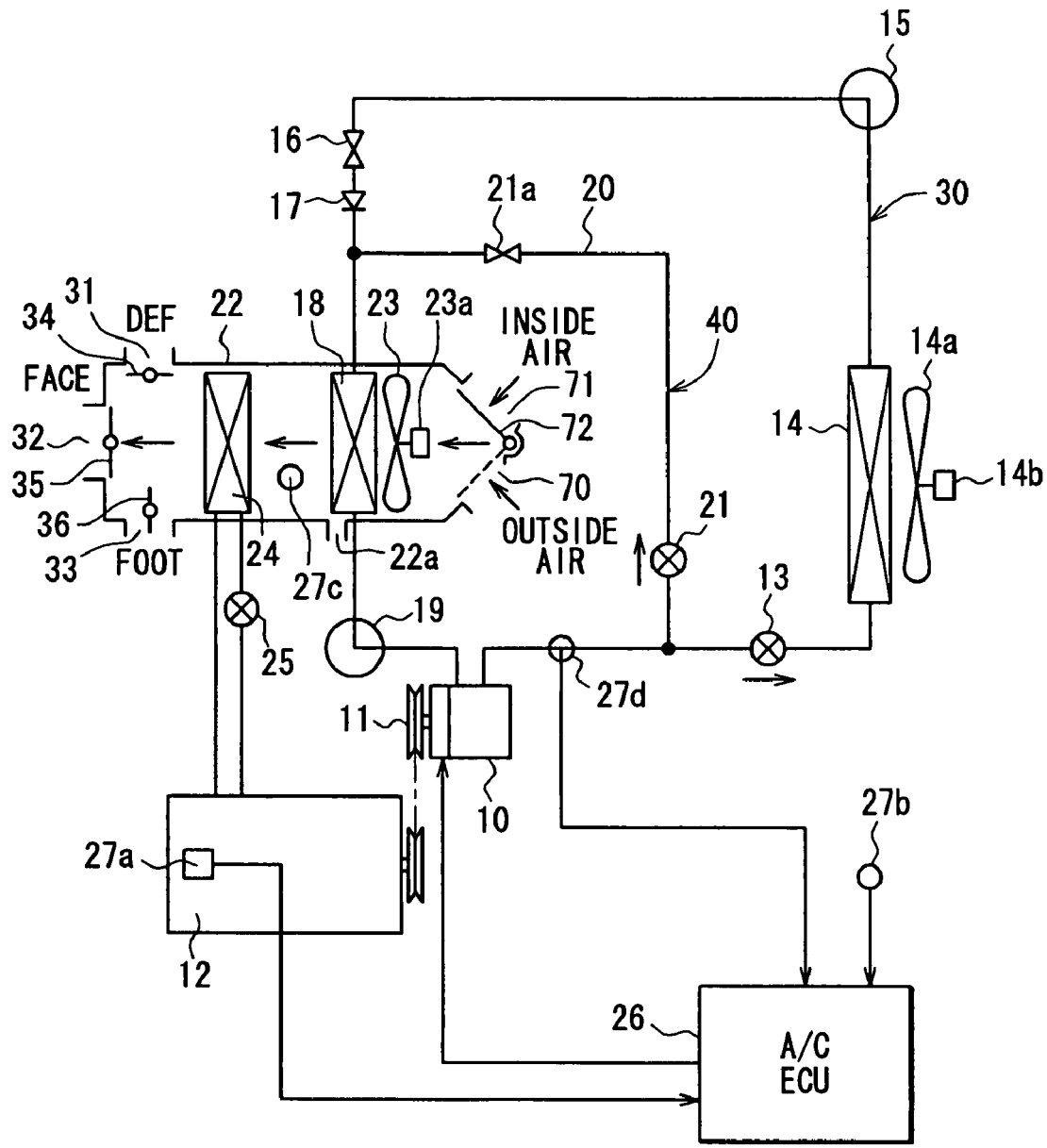
FIG. 1 is a schematic diagram showing a configuration of a vehicle air conditioner according to an embodiment of the present invention.
Figure 2:
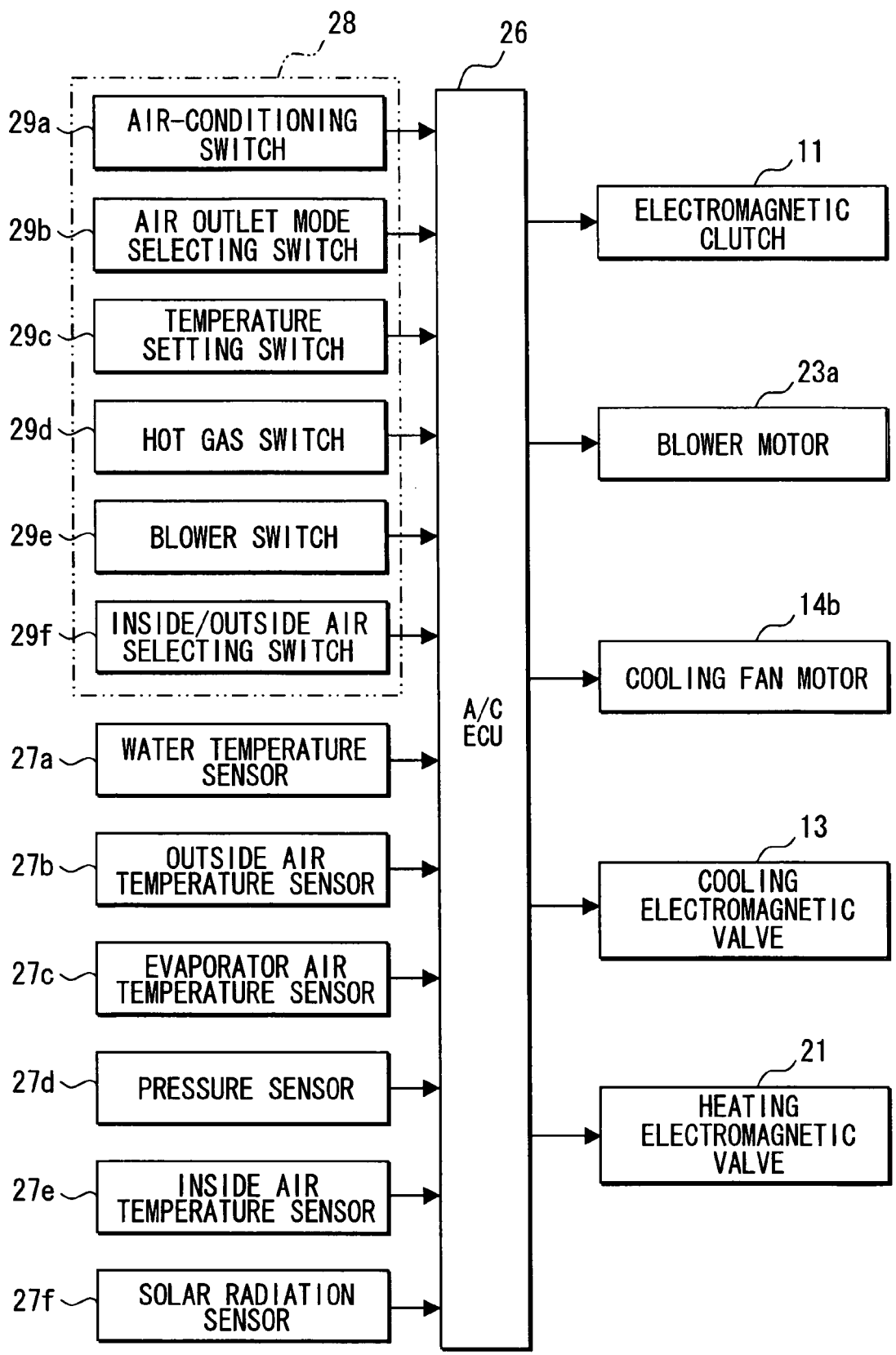
FIG. 2 is a block diagram showing a control construction of the vehicle air conditioner of the embodiment.

With reference to FIGS. 1, 2, a schematic configuration of a vehicle air conditioner according to an embodiment of the present invention will be described. FIG. 1 is a schematic view that shows the schematic configuration of the vehicle air conditioner according to the present embodiment.

A compressor 10 is driven by a water-cooled vehicle engine 12 via an electromagnetic clutch 11. A swash plate type compressor of a fixed displacement type, for example, may be employed for the compressor 10. A refrigerant discharge side of the compressor 10 is connected to an inlet side of a condenser 14 via a cooling electromagnetic valve 13. An outlet side of the condenser 14 is connected to a receiver 15, which receives a liquid refrigerant after a vapor-liquid separation of the refrigerant. The condenser 14, together with the compressor 10 and the like, is disposed in a vehicle engine room. The condenser 14 is an outside heat exchanger, in which heat is exchanged between outside air blown by an electrically operated cooling fan 14a and the refrigerant that flows inside the condenser 14.

An outlet side of the receiver 15 is connected to a thermostatic expansion valve 16, which is a cooling decompression device. An outlet side of the thermostatic expansion valve 16 is connected to an evaporator 18 via a check-valve 17. An outlet side of the evaporator 18 is connected to a suction side of the compressor 10 via an accumulator 19. The evaporator 18 is disposed in an air-conditioning case 22. The evaporator 18 is an inside heat exchanger, in which heat is exchanged between the air blown by an air-conditioning fan 23 and the refrigerant that flows inside the evaporator 18. The thermostatic expansion valve 16 controls a degree of valve opening such that a degree of superheat of the refrigerant at a refrigerant outlet of the evaporator 18 is approached to a predetermined value in a cooling mode. The accumulator 19 receives the liquid refrigerant after the vapor-liquid separation of the refrigerant flowing from the evaporator. A gas refrigerant and a small amount of liquid refrigerant with oil in a bottom area of the accumulator 19 are drawn into the compressor 10.

In this manner, a closed circuit from the refrigerant discharge side of the compressor 10 to the suction side of the compressor 10 via the cooling electromagnetic valve 13, the condenser 14, the receiver 15, the thermostatic expansion valve 16, the check-valve 17, the evaporator 18, and the accumulator 19 sequentially constitutes a refrigeration cycle 30 for cooling.

A hot gas bypass path 20, through which refrigerant flows while bypassing the condenser 14 and the like, is provided between the discharge side of the compressor 10 and an inlet side of the evaporator 18. A heating electromagnetic valve 21 and a throttle 21*a* are provided in series in the hot gas bypass path 20. The throttle 21*a* is a heating decompression means, and a fixed throttle such as an orifice and a capillary tube may be employed for the throttle 21*a*. A closed circuit from the discharge side of the compressor 10 to the suction side of the compressor 10 via the heating electromagnetic valve 21, the throttle 21*a*, the evaporator 18, and the accumulator 19 sequentially constitutes a hot gas heater cycle 40 for heating.

An air path through which air flows toward a vehicle interior is provided in the air-conditioning case 22. The air blown by the electrically operated air-conditioning fan 23 flows through the air path of the air-conditioning case 22. The air-conditioning fan 23 is, for example, a centrifugal blower having a centrifugal fan, and driven by a blower motor 23*a* controlled by a blower drive circuit. Air volume that is blown by the air-conditioning fan 23 can be selected continuously or in stages by regulating a blower control voltage that is applied to the blower motor 23*a*.

An outside air intake 70, which takes in air outside a vehicle compartment (outside air), an inside air intake 71, which takes in air inside the vehicle compartment (inside air), and an inside/outside air switch door 72 are provided near an intake side of the air-conditioning fan 23. The inside/outside air switch door 72 is driven by an actuator such as a servo-motor via a linkage (not shown). The inside/outside air switch door 72 switches between, at least an outside air mode, in which the outside air is taken in from the outside air intake 70 and an inside air mode, in which the inside air is taken in from the inside air intake 71.

The refrigerant circulates in the refrigeration cycle 30 for cooling in the cooling mode, and air blown by the electrically operated air-conditioning fan 23 is cooled through evaporation of the refrigerant (endotherm) in the evaporator 18. In a heating mode, a high-temperature refrigerant gas (hot gas) from the compressor 10 flows into the evaporator 18 through the hot gas bypass path 20, and heats the air, so that the evaporator 18 serves as a radiator.

In addition, a drain outlet 22*a* to drain water generated by condensation in the evaporator 18 is provided near a lower side of the evaporator 18 in the air-conditioning case 22. This condensed water is drained to an outside of the vehicle through a drain pipe (not shown) that is connected to the drain outlet 22*a*.

A water heating heat exchanger 24, which heats the blown air with engine coolant water (hot water) of the vehicle engine 12 as a heat source, is provided on a downstream air side of the evaporator 18 in the air-conditioning case 22. A warm water valve 25, which controls a flow of the coolant water, is provided in a warm water circuit between the heating heat exchanger 24 and the vehicle engine 12. The heating heat exchanger 24 is a main heating means for heating the vehicle compartment. On the other hand, the evaporator 18 that serves as the radiator in the hot gas heater cycle 40 is an auxiliary heating means.

A defroster air outlet 31 to blow warm air toward an inner surface of a windshield of the vehicle, a face air outlet 32 to blow mainly cold air toward an upper body of a vehicle occupant, and a foot outlet 33 to blow mainly the warm air toward the vehicle occupant's foot area are provided on a downstream air side of the heating heat exchanger 24 in the air-conditioning case 22. As well, a plurality of mode switch doors 34, 35, 36, which selectively open or close the defroster air outlet 31, the face air outlet 32 and the foot air outlet 33 respectively, is rotatably provided. In addition, the mode switch doors 34, 35, 36 constitute an air outlet mode switching means, and are driven by an actuator such as the servo-motor via a linkage (not shown).

An air-conditioning electronic control unit (air-conditioning ECU 26, which is a control means, includes a microcomputer and its peripheral circuitry. The air-conditioning ECU 26 performs predetermined processing according to a program that is set beforehand to control the cooling electromagnetic valve 13 and the heating electromagnetic valve 21 to open or close, and to control other electrical apparatuses such as the electromagnetic clutch 11, the cooling fan 14*a*, the air-conditioning fan 23, and the warm water valve 25 to operate.

FIG. 2 is a block diagram showing a schematic configuration of control of the vehicle air conditioner. As FIG. 2 shows, detection signals from a group of sensors, such as a water temperature sensor 27*a* of the vehicle engine 12, an outside air temperature sensor 27*b*, an evaporator air temperature sensor 27*c*, a pressure sensor 27*d* for a compressor discharged refrigerant pressure, an inside air temperature sensor 27*e*, and a solar radiation sensor 27*f* to detect the amount of solar radiation to the vehicle interior, are inputted into the air-conditioning ECU 26.

Through an operation of an air-conditioning operation panel 28, which is provided near an instrument panel in the vehicle compartment, operation signals from a group of operation switches, such as an air-conditioning switch 29*a*, an air outlet mode selecting switch 29*b*, a temperature setting switch 29*c*, a hot gas switch 29*d*, a blower switch 29*e*, and an inside/outside air selecting switch 29*f*, are inputted into the air-conditioning ECU 26.

The air-conditioning switch 29*a* is an operating switch, which gives a command to start or stop the operation of the compressor 10, and serves as a cooling switch to set the cooling mode. The hot gas switch 29*d* is an operation switch to set the heating mode (hot gas heating mode) using the hot gas heater cycle 40, and serves as a heating switch. The air outlet mode selecting switch 29*b* is an operation switch to select an air outlet mode of the air conditioning. The temperature setting switch 29*c* is an operation switch to set a temperature in the vehicle compartment at a desired temperature. The blower switch 29e is an operation switch to give a command to turn on or off the air-conditioning fan 23 and to change the air volume to be blown. The inside/outside air selecting switch 29f is an operation switch to give a command to switch between the outside air mode, the inside air mode and a mix mode for mixing the outside air and the inside air.

An operation of the vehicle air conditioner with the above configuration will be described below. When the air-conditioning switch 29a is turned on and the cooling mode is set, the air-conditioning ECU 26 controls the cooling electromagnetic valve 13 to open, and controls the heating electromagnetic valve 21 to close. After this, when the vehicle engine 12 drives the compressor 10 with the electromagnetic clutch 11 connected to the compressor 10 by the air-conditioning ECU 26, the gas refrigerant on the discharge side of the compressor 10 flows into the condenser 14 through the cooling electromagnetic valve 13, which is opened. Meanwhile, in the condenser 14, the refrigerant is cooled and condensed by the outside air that is blown by the cooling fan 14a. After passing through the condenser 14, the refrigerant separates into vapor and liquid in the receiver 15, and the liquid refrigerant alone is decompressed in the thermostatic expansion valve 16 and turned into a gas-liquid two-phase state with a low temperature and low pressure.

Then, the low-pressure refrigerant passes through the check-valve 17 and flows into the evaporator 18. The refrigerant absorbs heat from air-conditioning air blown by the air-conditioning fan 23 and evaporates. The air-conditioning air cooled in the evaporator 18 is blown into the vehicle compartment to cool the vehicle compartment. The gas refrigerant that evaporates in the evaporator 18 is drawn into the compressor 10 via the accumulator 19 to be compressed.

When the hot gas switch 29d is turned on in wintertime and the hot gas heating mode is set, the air-conditioning ECU 26 controls the cooling electromagnetic valve 13 to close, and controls the heating electromagnetic valve 21 to open, thereby opening the hot gas bypass path 20. The high-temperature gas refrigerant (overheated gas refrigerant) on the discharge side of the compressor 10 passes through the heating electromagnetic valve 21 that is opened, and flows into the evaporator 18 after being decompressed in the throttle 21a. That is, the overheated gas refrigerant (hot gas) from the compressor 10 flows into the evaporator 18 by bypassing the condenser 14 and the like. Meanwhile, the check-valve 17 prevents the flowing of the gas refrigerant in the hot gas bypass path 20 into the thermostatic expansion valve 16.

Consequently, the refrigerant cycle is operated by the hot gas heater cycle 40, which includes the closed circuit from the discharge side of the compressor 10 to the suction side of the compressor 10 via the heating electromagnetic valve 21, the throttle 21a, the evaporator 18, and the accumulator 19 sequentially. The hot gas refrigerant that is decompressed in the throttle 21a radiates heat to air passing through the evaporator 18 to heat the blown air. The hot gas refrigerant, which radiates the heat in the evaporator 18, is drawn into the compressor 10 via the accumulator 19 to be compressed.

In addition, when a temperature of the engine coolant water is low (e.g., immediately after starting of the vehicle engine 12), the air-conditioning fan 23 is controlled to warm up to start with small air volume. The blown air, which is heated in the evaporator 18 in the heating mode, is further heated in the heating heat exchanger 24 using hot water flowing into the heating heat exchanger 24 via the warm water valve 25. As a result, even when it is in cold season, the vehicle air conditioner can blow warmer air, which is heated by both the evaporator 18 and the heating heat exchanger 24, into the vehicle compartment.

Next, an overall flow of an operation and control of the vehicle air conditioner in the hot gas heating mode according to the present embodiment will be described below. A procedure for the control that the air-conditioning ECU 26 performs is specifically shown in a flowchart in FIG. 3.

Figure 3:
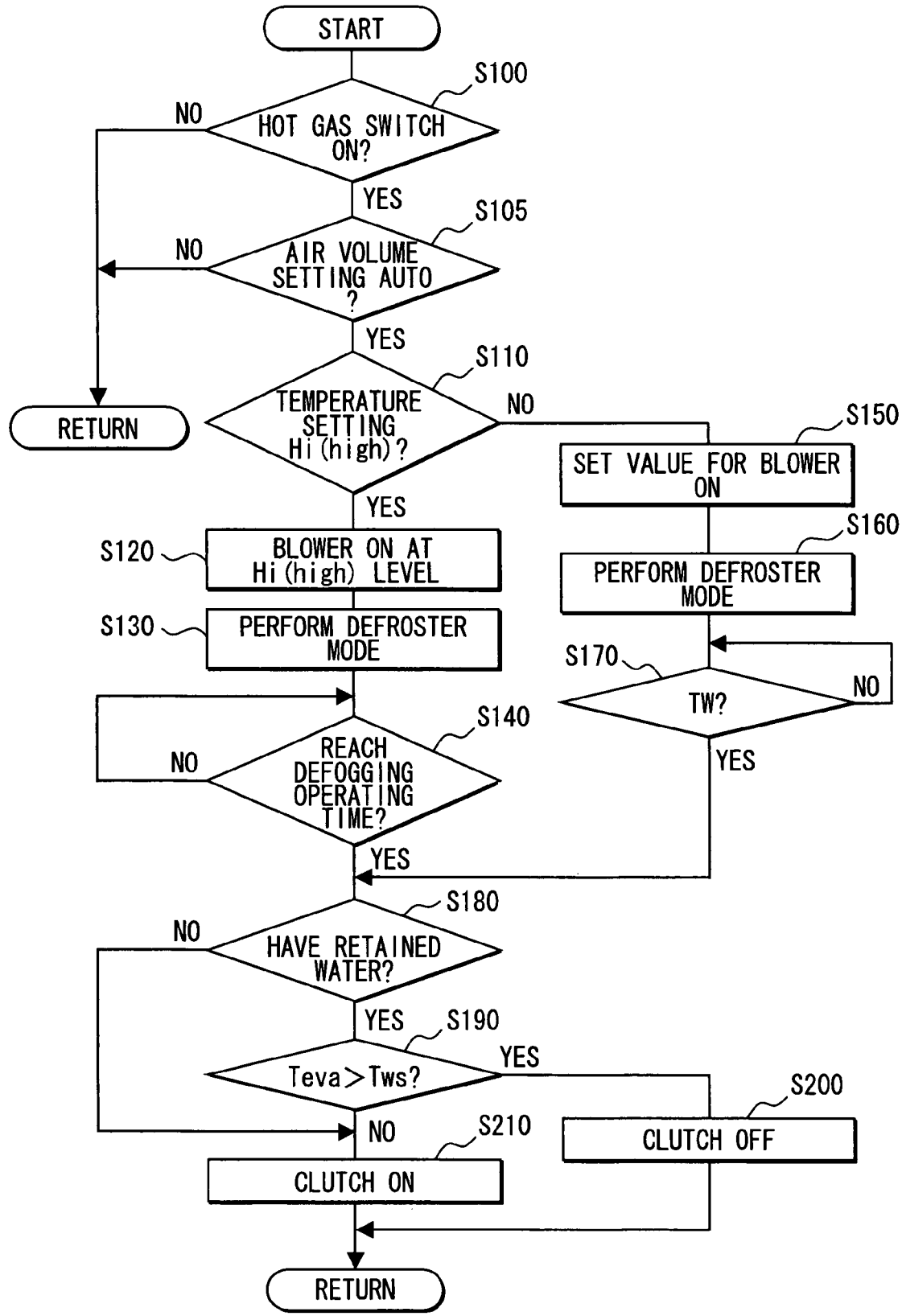
FIG. 3 is a flowchart showing control in a hot gas heating mode in the vehicle air conditioner of the embodiment.

First, the control flow shown in FIG. 3 starts when the vehicle engine 12 is started (an ignition switch is turned on), and the air-conditioning ECU 26 determines whether the hot gas switch 29d of the air-conditioning operation panel 28 is turned on (step 100 (S100)). The air-conditioning ECU 26 does not proceed to the next step 105 (S105) until it determines that the hot gas switch 29d is turned on.

When the air-conditioning ECU 26 determines that the hot gas switch 29d is turned on, that is, when the hot gas heating mode is set, control proceeds to S105 to determine whether the air volume is set in an automatic (AUTO) operation mode. If the air volume is set in other than the automatic operation mode, that is, if predetermined air volume is manually set by the vehicle occupant, it is determined that the air volume is in a manual mode, and the control of the present embodiment is not performed, so that control does not proceed to the next step 110 (S110) until the automatic operation mode is set for the air volume.

When it is determined that the automatic operation mode is set, the air-conditioning ECU 26 proceeds to S110 to determine whether temperature is set at a high temperature (Hi) or not. Temperature settings other than Hi include a case where the vehicle occupant manually sets the temperature in advance.

When it is determined that the temperature is set at Hi at S110, the air-conditioning ECU 26 controls the air-conditioning fan 23 (blower) to operate at a high level (maximum) of blown air volume (Hi-level blown air volume) (step 120 (S120)), and performs a blowing operation, in which the air outlet mode is set in a defroster mode (step 130 (S130)). In the defroster mode, air is blown toward an inner surface of a windshield of the vehicle.

The operations at S120, S130 are continuously performed (step 140 (S140)) for a predetermined blowing time (e.g., a defogging operating time T0) according to the Hi-level blown air volume. The defogging operating time is a blowing time, during which the air is blown toward the windshield before a refrigerant collecting operation to restrict a fog on the windshield, and is obtained through verification experiments using an actual vehicle, simulations and the like according to the blown air volume. As shown in a time chart in FIG. 4, T0 is set at, for example, 120 seconds when the air volume is set at the Hi level (a blower voltage: 12V).

The refrigerant collecting operation sets the refrigerant cycle in the cooling mode with the cooling electromagnetic valve 13 opened, and the heating electromagnetic valve 21 closed, and starts the compressor 10 with the electromagnetic clutch 11 turned on. Consequently, the refrigerant circulates through the refrigerant cycle using a refrigerant circulation path in the cooling mode, thereby pushing out the refrigerant accumulated in the condenser 14 by the refrigerant discharged from the compressor 10 to be collected in the evaporator 18. The refrigerant collecting operation with the cooling mode performs for a predetermined time.

Figure 4:
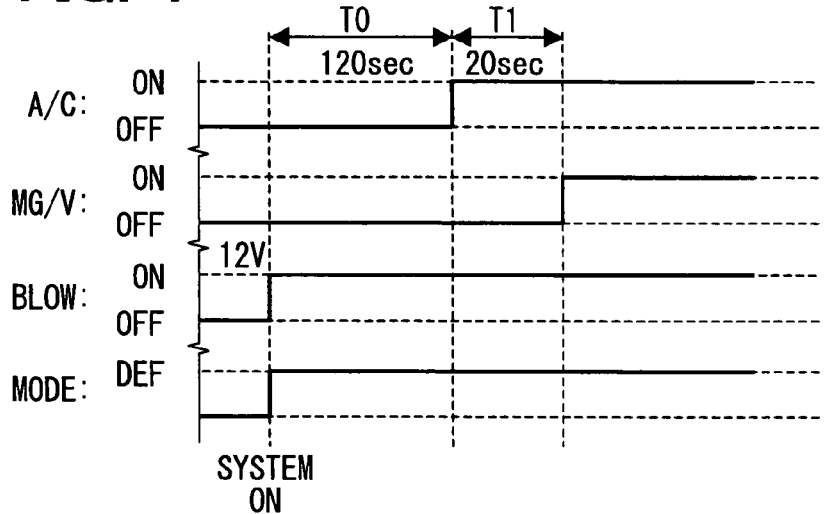
FIG. 4 is a time chart showing an example of an operation state of each unit at S120 to S140 in FIG. 3 and during a refrigerant collecting operation.

Additionally, FIG. 4 is an example of the time chart showing states of the air-conditioning switch 29a (A/C), the heating electromagnetic valve 21 (MG/V), the air-conditioning fan 23 (BLOW), and the air outlet mode during S120 to S140 and the refrigerant collecting operation. The time chart shows each state when the blown air volume is set at the maximum (Hi) level.

T0 (e.g., 120 seconds) in the time chart is the defogging operating time that is reckoned after the air-conditioning fan 23 is turned on with the blown air volume at the maximum level and the air outlet mode is set in the defroster mode. When the antifog operating time T0 passes after the control is started, the air-conditioning switch 29a is turned on and counting of a compressor operating time T1 (e.g., 20 seconds, which will be described below in detail) during the refrigerant collecting operation is started. After the counting of T1 is finished, the compressor 10 is stopped, and the heating electromagnetic valve 21 is switched to be opened.

Figure 6:
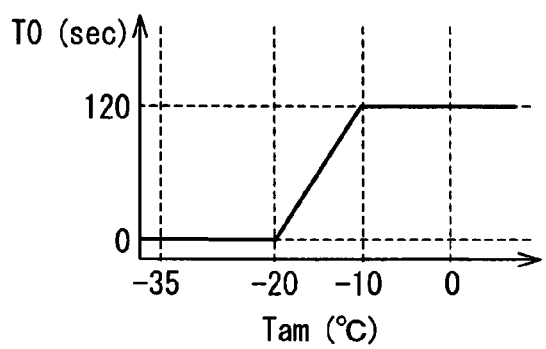
FIG. 6 is a graph showing a control characteristic of a defogging operating time that is used in a determination process at S140 in FIG. 3 when blown air volume is at a Hi level.

An example of a control characteristic of the defogging operating time, which is stored in a storing means of the present embodiment, will be described with reference to FIG. 6. FIG. 6 is a diagram of the control characteristic, which is used in the determination process at S140, and shows the control characteristic of the defogging operating time T0 in accordance with an outside air temperature Tam (° C.) when the blown air volume is set at the maximum (Hi) level with its horizontal axis being the outside air temperature Tam (° C.), and its vertical axis being the defogging operating time T0 (sec).

As shown in FIG. 6, when Tam is equal to or lower than −20 (° C.), T0 is 0 (sec), so that the defogging operating time is not set. When Tam is within the range of −20 to −10 (° C.), T0 increases linearly from 0 (zero) to 120 (sec) as Tam increases. When Tam is equal to or higher than −10 (° C.), T0 is set at a fixed value of 120 (sec).

When it is determined that the set temperature is temperature other than a high temperature Hi (e.g., in the automatic (AUTO) operation mode, in which the vehicle occupant has set the temperature arbitrarily) at S110, the air-conditioning ECU 26 controls the setting for the air-conditioning fan 23 (blower) to be predetermined air-blowing volume (step 150 (S150)), and sets the air outlet mode at the defroster mode (step 160 (S160)). The air-blowing volume is set within the range of Lo (voltage applied: 4V) at the time of the starting of the blower to Hi (voltage applied: 12V), in accordance with a difference between the set temperature and an actual inside air temperature of the vehicle compartment. This setting of the air-blowing volume restricts a sense of a cold wind, and takes heating initiation properties into account. In the present embodiment, the air volume of the blower is set in advance, for example, with the voltage applied being 6V in FIG. 5, such that the vehicle occupant does not feel the sense of the cold wind in an initial state and that it has excellent defogging properties.

Operations at S150, S160 are continuously performed (step 170 (S170)) until the temperature of the coolant water of the vehicle engine 12 coincides with a predetermined temperature TW. The predetermined temperature TW is obtained through the verification experiments using the actual vehicle, simulations and the like, such that the warm water, the temperature of which has increased to the predetermined temperature TW, flows into the heating heat exchanger 24, and the air heated in the heating heat exchanger 24 is blown toward the windshield before the refrigerant collecting operation, so as to prevent the fog on the windshield at the time of the starting of the refrigerant collecting operation. In addition, the predetermined temperature TW is stored in advance in the storing means of the air-conditioning ECU 26.

Figure 5:
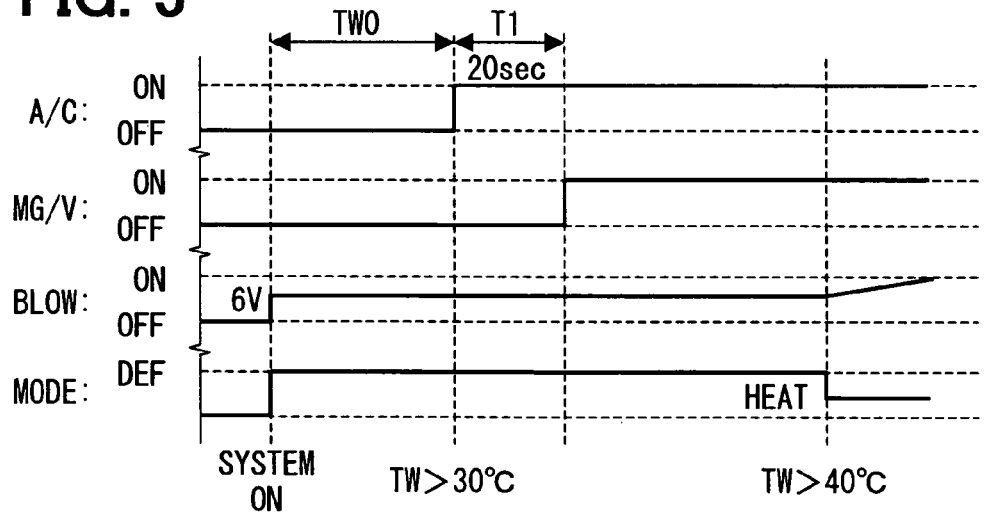
FIG. 5 is a time chart showing an example of an operation state of each unit at S150 to S170 in FIG. 3 and during the refrigerant collecting operation.

FIG. 5 is a time chart, which shows the states of the air-conditioning switch 29a (A/C), the heating electromagnetic valve 21 (MG/V), the air-conditioning fan 23 (BLOW), and the air outlet mode (MODE) during S150 to S170 and the refrigerant collecting operation, as an example.

TW0 in FIG. 5 is a time that is estimated to be necessary for the temperature of the coolant water of the vehicle engine 12 to coincide with the predetermined temperature TW (in this example, 30° C.). The estimated time TW0 is obtained through the verification experiments using the actual vehicle, simulations and the like. Instead of the determination process at S170, the air-conditioning ECU 26 may determine that the temperature of the coolant water coincides with the predetermined temperature TW by the end of the counting of the estimated time TW0.

As shown in FIG. 5, when the control system is started, the air-conditioning fan 23 (BLOW) is controlled to operate with the blown air volume, which is set in the automatic operation mode. At the same time, after the defroster mode is set, the counting of the estimated time TW0 is started. When the counting of the estimated time TW0 is finished, the counting of the compressor operating time T1 (e.g., 20 seconds, which will be described below in detail) during the refrigerant collecting operation is started. When the counting of the compressor operating time T1 is finished, the compressor 10 is stopped, and the heating electromagnetic valve 21 is switched to be opened.

Figure 7:
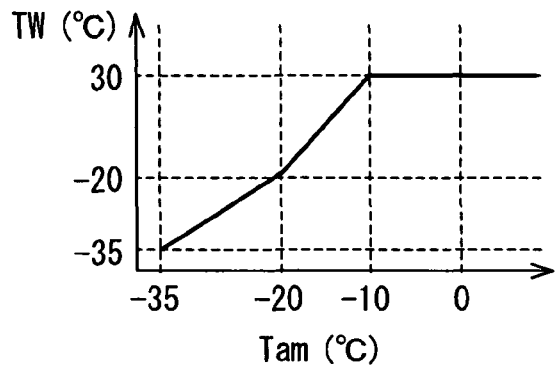
FIG. 7 is a graph showing a control characteristic of an engine coolant water temperature TW, which is used in a determination process at S170 in FIG. 3.

An example of control characteristics of the predetermined temperature TW of the coolant water, which is stored in the storing means of the present embodiment, and the estimated time TW0 for the predetermined temperature TW will be described with reference to FIG. 7. FIG. 7 shows the control characteristics of the predetermined temperature TW of the coolant water in the automatic operation mode, with its horizontal axis being the outside air temperature Tam (° C.), and its vertical axis being the predetermined temperature TW (° C.) of the coolant water.

As shown in FIG. 7, when Tam is equal to or lower than −10° C., TW increases approximately linearly from −35° C. to 30° C. as Tam increases. When Tam is equal to or higher than −10° C., TW is set at a fixed value of 30° C., for example. In other words, TW=30° C. is the temperature of the coolant water, in which a defogging effect on the windshield determined based on the results of the experiments using the actual vehicle is expected. TW0 is stored beforehand in the storing means as a time, which is necessary for the temperature of the coolant water to coincide with 30° C.

Additionally, steps S100 to S170 indicate processing in which the air is blown toward the inner surface of the windshield to restrict the fog on the windshield in the hot gas heating mode before the starting of the refrigerant collecting operation. The air-conditioning ECU 26 may perform processing to start the refrigerant collecting operation immediately after this processing is finished, although this processing is not shown in the flowchart in FIG. 3. In such a case, the air-conditioning ECU 26 does not perform the next step 180 (S180), but carries out step 210 (S210) to start a hot gas operation, and returns to the START of FIG. 3 to repeat a series of steps.

In this manner, the air-conditioning ECU 26 controls the air conditioning components so as to blow the air toward the inner surface of the windshield of the vehicle under certain conditions before the starting of the refrigerant collecting operation. Accordingly, the windshield is heated in advance in the air blowing processing before the starting of the refrigerant collecting operation, so that the fog on the windshield that is caused by the amount of retained water, which includes the amount of condensed water generated during the refrigerant collecting operation, can be restricted.

Furthermore, after this air blowing processing and before the refrigerant collecting operation, the air-conditioning ECU 26 may perform the following processing, in which the retained water in the evaporator 18 is determined and an air temperature Teva flowing out of the evaporator 18 is controlled. First, the air-conditioning ECU 26 determines whether water is retained in the evaporator 18 (S180). The amount A of the retained water at S180 can be calculated basically by an equation A=A (stored)+A (condensed)−A (evaporated)−A (drained). Here, A is the amount of the retained water in the evaporator, A (stored) is a stored amount of the retained water, A (condensed) is the amount of the condensed water, A (evaporated) is the amount of evaporated water, and A (drained) is the amount of drained water.

The stored amount A (stored) of the retained water is calculated and stored in the storing means of the air-conditioning ECU 26 when a predetermined time elapses after the engine is stopped at previous time. The amount A (condensed) of the condensed water is a water amount generated on the evaporator 18 in the cooling mode. The amount A (evaporated) of evaporated water is a water amount that is evaporated in the heating mode. The amount A (drained) of drained water is a drained water amount while the compressor 10 is left stopped.

When the amount of the retained water in the evaporator 18 is approximately 0 (zero), the condensed water does not evaporate in the evaporator 18 even if the evaporator 18 serves as the radiator of the hot gas refrigerant, so that the fog on the windshield is not caused. Thus, when it is determined that the amount of the retained water in the evaporator 18 is approximately 0 (zero) at S180, the air-conditioning ECU 26 energizes the electromagnetic clutch 11 to connect (ON) the electromagnetic clutch 11 to the compressor 10 (S210).

Through this control, the compressor 10 is driven by the vehicle engine 12 via the electromagnetic clutch 11 to be turned on (ON), and the refrigerant collecting operation, which is a preparative operation for the hot gas heating operation, is started. Then, after the starting of the hot gas heating operation, the air-conditioning ECU 26 returns to the START of FIG. 3 to repeat a series of steps.

On the other hand, when the air-conditioning ECU 26 determines that the water is retained in the evaporator 18 at S180, it is determined whether the temperature Teva of air flowing out of the evaporator 18 is higher than a temperature Tws of the windshield at step 190 (S190). The temperature of air flowing out of the evaporator 18 is detected by the evaporator air temperature sensor 27*c*. The temperature Tws of the windshield is a temperature of the inner surface of the windshield of the vehicle, and is calculated based on the outside air temperature Tam and an increased amount of temperature due to the air (warm air) blown into the vehicle interior.

The temperature Tws of the windshield is the same as the outside air temperature Tam in an initial state before the starting of the air-conditioning operation. When the warm air is blown into the vehicle interior by setting the heating mode, the temperature of the windshield increases. Hence, given ΔTws, which is the increased amount of the windshield temperature due to the warm air blown into the vehicle interior, the windshield temperature Tws is calculated by an equation, Tws=Tam+ΔTws.

The air-conditioning ECU 26 shuts off (OFF) the energization of the electromagnetic clutch 11 to stop (OFF) the compressor 10 (step 200 (S200)) when the temperature Teva of air flowing out of the evaporator 18 is higher than the windshield temperature Tws. On the other hand, when the temperature Teva on the air blowing side of the evaporator 18 is equal to or lower than the windshield temperature Tws, the air-conditioning ECU 26 energizes the electromagnetic clutch 11 to connect (ON) the electromagnetic clutch 11 to the compressor 10 (S210). Through this control, the compressor 10 is driven by the vehicle engine 12 via the electromagnetic clutch 11, and is turned on (ON). Accordingly, the refrigerant collecting operation is started as described above, and then control returns to the START of FIG. 3 to repeat a series of steps.

In addition, the determination process at S190 is carried out based on a control characteristic of a relationship between the windshield temperature Tws, in which the fog is not generated on the windshield, and the temperature Teva on the air blowing side of the evaporator 18. The control characteristic is determined based on a fogging limit line that is obtained from the results of the experiments, through which the defogging effect in the hot gas heating mode of the vehicle air conditioner is verified. The control characteristic is stored in advance in the air-conditioning ECU 26. The fogging limit line is expressed in a linear equation with its horizontal axis being the windshield temperature Tws, and its vertical axis being the temperature Teva on the air blowing side of the evaporator 18.

More specifically, when the windshield temperature Tws varies, by controlling the temperature Teva on the air blowing side of the evaporator 18 to be a temperature, which corresponds to the temperature that is equal to or lower than the windshield temperature Tws on the fogging limit line, the fog on the windshield can be prevented. In other words, since the temperature Teva on the air blowing side of the evaporator 18 on the fogging limit line is slightly higher than the windshield temperature Tws, the controlling of the temperature Teva on the air blowing side of the evaporator 18 to be equal to or lower than the windshield temperature Tws as in the processing at S190, S200 can ensure that the fog on the windshield is restricted.

At S180, S190, S200 as above, the controlling of an operation of the compressor 10 can control the temperature on the air blowing side of the evaporator 18 to be equal to or lower than the windshield temperature. Through this control, even though the air blown into the vehicle compartment contacts the windshield to be cooled to a similar temperature to the windshield, relative humidity of the blown air from the evaporator 18 only increases to a value. That is, the temperature on the air blowing side of the evaporator 18 is controlled, such that the air blown into the vehicle compartment does not reach a dew point even if it is cooled by the windshield.

Accordingly, even if a large amount of condensed water evaporates in the evaporator 18, by performing the control at S180, S190, S200 together with the processing, in which the air is blown toward the windshield of the vehicle before the refrigerant collecting operation is started, the defogging effect can be produced significantly on the windshield.

Figure 8A:
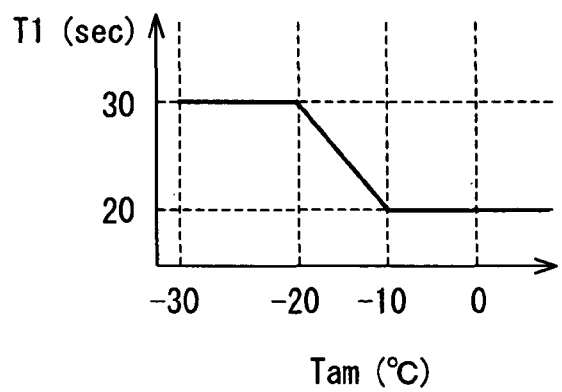
FIG. 8A is a graph showing a control characteristic of an air conditioning operating time T1 during the refrigerant collecting operation of the vehicle air conditioner of the embodiment.
Figure 8B:
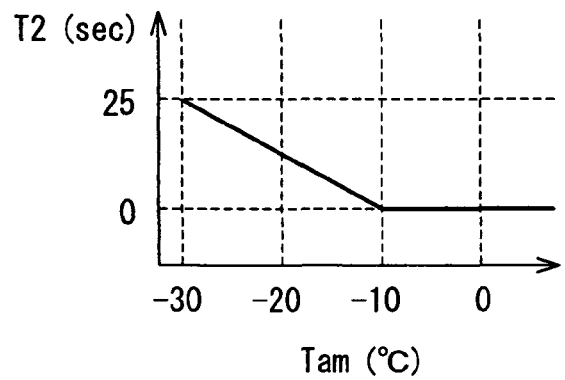
FIG. 8B is a graph showing a control characteristic of an air conditioning stopping time T2 during the refrigerant collecting operation.

Additionally, a time for the refrigerant collecting operation includes the minimum operating time (air conditioning operating time) T1 of the compressor 10 to collect the refrigerant and a stopping time (air conditioning stopping time) T2, during which the operation of the compressor 10 is stopped after the operating time T1 elapses. FIG. 8A is a diagram showing a control characteristic of the air conditioning operating time T1 in accordance with the outside air temperature Tam during the refrigerant collecting operation. FIG. 8B is a diagram showing a control characteristic of the air conditioning stopping time T2 in accordance with the outside air temperature Tam.

As shown in FIGS. 8A, 8B, in the refrigerant collecting operation, which is started at S210, when the outside air temperature Tam is equal to or higher than a predetermined outside air temperature (e.g., −10° C.), it is preferable that the air conditioning operating time T1 or the air conditioning stopping time T2 should be controlled to be a shorter time than when the outside air temperature Tam is lower than the predetermined outside air temperature. For example, T1 is set at 30 (sec) when the outside air temperature Tam is lower than −20° C. T1 decreases linearly as Tam increases when Tam is between −20° C. to −10° C. T1 is set at a fixed value of 20 (sec) when Tam is equal to or higher than −10° C. T2 decreases linearly as Tam increases when Tam is lower than −10° C. T2 is set at a fixed value of 0 (sec) when Tam is equal to or higher than −10° C.

The air-conditioning ECU 26 of the vehicle air conditioner of the present embodiment can perform the control to blow the air toward the inner surface of the windshield of the vehicle without operating the compressor before the refrigerant collecting operation is carried out. According to this control, because the windshield is heated before the refrigerant collecting operation is performed, the air-conditioning air that is blown in the refrigerant collecting operation before the starting of the hot gas operation is cooled to such an extent that it does not reach the dew point. Consequently, the fog on the windshield due to air from the evaporator 18, which includes the amount of the condensed water during the refrigerant collecting operation, can be restricted.

Moreover, the warm air can be blown continuously toward the inner surface of the windshield for a time before the air-conditioning ECU 26 performs the refrigerant collecting operation. When this air-blowing control is employed before the refrigerant collecting operation, wasted blown air for preventing the fog can be restricted, and all air-blowing operation can be effectively performed. For example, the air-conditioning ECU 26 may perform air-blowing operation toward the windshield for a predetermined time by the air volume that is set by a user of the vehicle or that is set by the control means in the automatic operation mode, or the air-conditioning ECU 26 may continue the air blowing operation for the time (TW0) that is necessary for the temperature of the coolant water of the vehicle engine 12 to coincide with the predetermined temperature (TW=30° C.).

Furthermore, the air-conditioning ECU 26 may perform the air-blowing operation toward the inner surface of the windshield of the vehicle before the refrigerant collecting operation is carried out until the temperature of the coolant water of the vehicle engine 12 coincides with the predetermined temperature (TW=30° C.). When this control is employed, the defogging effect above a certain level can be produced regardless of the blown air volume.

Besides, the air-conditioning ECU 26 may perform the air-blowing operation with a predetermined air volume toward the inner surface of the windshield of the vehicle before the refrigerant collecting operation is carried out until the temperature of the coolant water of the vehicle engine 12 coincides with the predetermined temperature TW, or until the time TW0, which is necessary for the temperature of the coolant water of the vehicle engine 12 to coincide with the predetermined temperature TW, elapses. The predetermined air volume is set based on the sense of the cold wind in the initial state and the antifog properties on the windshield. For example, when the temperature is set at Hi, the blown air volume of the blower may be set at the Hi (maximum) level. When the temperature is set at other than Hi, the blown air volume of the blower may be set at an M1 (first intermediate air volume) level or an M2 (second intermediate air volume) level, at which the vehicle occupant does not feel the sense of the cold wind in an initial state and excellent antifog properties are manifested.

This control can further ensure that a temperature of the surface of the windshield before the refrigerant collecting operation is carried out is increased to a temperature, which is necessary for the antifogging.

In addition, the air-conditioning ECU 26 may perform the air-blowing operation toward the inner surface of the windshield of the vehicle before the refrigerant collecting operation is carried out when the outside air temperature is equal to or higher than −10° C. When this control is employed, the air-conditioning ECU 26 does not blow the air toward the inner surface of the windshield when the temperature of the windshield is lower than −10° C., where a temperature of the blown air does not readily reach the dew point. Therefore, operating efficiency of the vehicle air conditioner can be improved.

Other Embodiment

Thus far, the example embodiment of the present invention has been described. Nevertheless, the present invention may not be by any means limited to the above embodiment, and it can be embodied by making various changes without departing from the scope of the invention.

As can be seen from the flowchart in FIG. 3, after the air is blown toward the inner surface of the windshield (S100 to S170) before the refrigerant collecting operation is started, the refrigerant collecting operation is not started (S180 to S210) until the amount of the retained water in the evaporator 18 becomes approximately 0 (zero), or until a temperature of the air on the blowing side of the evaporator 18 is reduced to equal to or lower than the predetermined temperature, in which the temperature of the air on the blowing side of the evaporator 18 does not reach the dew point even if it is cooled by the windshield. In addition to such a series of steps, for example, the refrigerant collecting operation may be started immediately instead of performing S180 to S210, after the air blowing processing (S100 to S170) is carried out in an other embodiment of the present invention.

Additional advantages and modifications will readily occur to those skilled in the art. The invention in its broader terms is therefore not limited to the specific details, representative apparatus, and illustrative examples shown and described.

What is claimed is:

1. An air conditioner for a vehicle, comprising:
   a compressor for compressing refrigerant;
   an exterior heat exchanger for exchanging heat between outside air outside of a vehicle compartment and refrigerant flowing therethrough;
   a cooling decompressor for decompressing refrigerant in a cooling mode operation;
   an interior heat exchanger for exchanging heat between air to be blown into the vehicle compartment and refrigerant flowing therethrough; and
   a control unit for performing the cooling mode operation and a heating mode operation, wherein:
      the control unit performs the cooling mode operation with a cooling refrigeration cycle, in which refrigerant discharged from an outlet of the compressor is drawn to an inlet of the compressor after passing through the exterior heat exchanger, the cooling decompressor, and the interior heat exchanger in this order, so that the interior heat exchanger operates as an evaporator, in which the refrigerant evaporates by absorbing heat from air to be blown into the vehicle compartment;

the control unit performs the heating mode operation with a hot gas heater cycle, in which refrigerant discharged from the outlet of the compressor flows through the interior heat exchanger while bypassing the exterior heat exchanger through a hot gas bypassing path, so that the interior heat exchanger operates as a radiator, which radiates heat to air to be blown into the vehicle compartment;

the control unit performs a refrigerant collecting operation, in which refrigerant staying in the exterior heat exchanger is pushed out using refrigerant discharged from the compressor, before performing the heating mode operation; and the control unit performs an air blowing operation in which air is blown toward an inner surface of a windshield of the vehicle without driving the compressor, before performing the refrigerant collecting operation.

2. The air conditioner according to claim 1, wherein the control unit continues to perform the air blowing operation toward the inner surface of the windshield of the vehicle for a time, which is stored in advance and corresponds to a flow amount of air blown toward the inner surface of the windshield, before performing the refrigerant collecting operation.

3. The air conditioner according to claim 1, further comprising a water heat exchanger for heating air to be blown into the vehicle compartment with coolant water of a vehicle engine as a heat source, wherein the control unit performs the air blowing operation toward the inner surface of the windshield of the vehicle until a temperature of the coolant water of the vehicle engine coincides with a predetermined temperature, before performing the refrigerant collecting operation.

4. The air conditioner according to claim 1, further comprising a water heat exchanger for heating air to be blown into the vehicle compartment with coolant water of a vehicle engine as a heat source, wherein the control unit continues the air blowing operation toward the inner surface of the windshield of the vehicle for a time, which is necessary for the temperature of coolant water of the vehicle engine to coincide with a predetermined temperature, before performing the refrigerant collecting operation.

5. The air conditioner according to claim 1, further comprising a water heat exchanger for heating air to be blown into the vehicle compartment with coolant water of a vehicle engine as a heat source, wherein the control unit performs the air blowing operation toward the inner surface of the windshield of the vehicle with a predetermined air volume until the temperature of coolant water of the vehicle engine coincides with a predetermined temperature, or until a time, which is necessary for the temperature of the coolant water to coincide with the predetermined temperature, elapses, before performing the refrigerant collecting operation.

6. The air conditioner according to claim 1, wherein the control unit performs the air blowing operation toward the inner surface of the windshield of the vehicle before performing the refrigerant collecting operation when a temperature of outside air outside of the vehicle compartment is equal to or higher than a predetermined temperature.

7. The air conditioner according to claim 6, wherein the predetermined temperature is $-10°$ C.

8. The air conditioner according to claim 1, further comprising a blower for blowing air into the vehicle compartment, wherein the control unit controls an air amount blown from the blower in the air blowing operation.

9. The air conditioner according to claim 1, further comprising a heating decompressor for decompressing refrigerant before flowing into the interior heat exchanger in the hot gas heater cycle during the heating mode operation.

* * * * *